US006340011B1

(12) United States Patent
Jainek

(10) Patent No.: US 6,340,011 B1
(45) Date of Patent: Jan. 22, 2002

(54) INTAKE DUCT FOR AN INTERNAL COMBUSTION ENGINE

(75) Inventor: Herbert Jainek, Heilbronn (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/615,315

(22) Filed: Jul. 13, 2000

(30) Foreign Application Priority Data

Jul. 15, 1999 (DE) .......................................... 199 33 032

(51) Int. Cl.⁷ .............................................. F02M 35/10
(52) U.S. Cl. .............................. 123/184.24; 123/184.42
(58) Field of Search ........................ 123/184.24, 184.42, 123/184.47, 184.34, 184.21

(56) References Cited

U.S. PATENT DOCUMENTS

| 5,657,727 A | * | 8/1997 | Uchida ................... | 123/184.34 |
| 6,024,066 A | * | 2/2000 | Nakayama et al. ..... | 123/184.24 |
| 6,142,114 A | * | 11/2000 | Yoshikawa ............. | 123/184.42 |

FOREIGN PATENT DOCUMENTS

DE 195 39 078 4/1997

* cited by examiner

*Primary Examiner*—Marguerite McMahon
(74) *Attorney, Agent, or Firm*—Crowell & Moring LLP

(57) ABSTRACT

An air intake duct for an internal combustion engine, which has a plurality of intake tubes 13. In one of the intervening spaces 15 between the intake tubes a working element, especially a filter housing 16, is contained. The latter communicates directly with the crankcase of the internal combustion engine, which is not shown in the drawings. The intake duct 10 is affixed over this connection, while the outlets 24 are joined to the internal combustion engine through resilient or elastic isolating elements. The advantage of the intake duct according to the invention lies in improved accessibility of the filter housing, since by unscrewing the cover 17 the filter insert can easily be replaced. Due to the upright position of the filter housing a positively controlled drainage is furthermore assured. By providing ribs 18*a*, 18*b*, between the intake tubes and the filter housing a stiffening of the intake tube is made possible, so that the individual component areas can be made with thinner walls, thereby saving material.

15 Claims, 2 Drawing Sheets

INTAKE DUCT FOR AN INTERNAL COMBUSTION ENGINE

BACKGROUND OF THE INVENTION

The invention relates to an intake duct for an internal combustion engine with a manifold chamber and a plurality of intake tubes for the combustion air.

Such intake ducts are known in the prior art. For example, co-pending U.S. patent application Ser. No. 09/041,742 (=DE 195 39 078) shows an intake duct with a common manifold chamber and four intake tubes running therefrom and terminating in a cylinder head flange where outlets are formed at the cylinder-related ends. The air guidance geometry of this intake duct must be designed for its acoustical qualities as well as its aerodynamic performance. For this purpose certain cavities, e.g. bypass resonators, and certain intake tube lengths are necessary, for example in order to achieve the vibration loading of a resonance chamber.

These structural measures considerably improve the performance of intake ducts. The disadvantage is that the free configuration of the intake duct is limited by the laws of physics. In particular, allowances have to be made to provide for accessibility on the one hand and aerodynamics on the other for additional units for which space must be found on the internal combustion engine. This entails expense, so that the economy of the internal combustion engine as an overall assembly is impaired.

SUMMARY OF THE INVENTION

It is therefore the object of the invention to provide an intake duct combining good aerodynamics with easy accessibility of other units mounted on the motor.

This and other object of the invention are achieved by providing an intake duct for an internal combustion engine, which has a manifold with an inlet for combustion air and at least two intake tubes with outlets at the cylinder-related end, wherein a intervening space is provided, which is formed by adjacent intake tubes for an additional working element of the internal combustion engine.

The intake duct of the invention has a space between two adjacent intake tubes which can be used for mounting an additional working element of the internal combustion engine. This working element is then advantageously accessible easily from above, since the intake duct is mounted in the upper part of the internal combustion engine. This improves the servicing properties of the working element, thereby allowing greater economy in the operation of the internal combustion engine.

The working element can comprise, for example, an oil separator for the crankcase gases of the internal combustion engine. Another possibility is the containing of the oil filter for cleaning the lubricant oil of the internal combustion engine. Ease of service in these embodiments primarily has to do with the changing of the filter elements. If the intervening space is used for mounting a filter housing, this has the additional advantage that it can be mounted upright on the internal combustion engine. The result is a positively controlled draining of the filter housing when the filter is changed, which is desirable to enable a drip-free change of the oil filter.

In one practical embodiment of the concept of the invention, the filter housing can be affixed to the intake duct. The result is a compact structural unit which, when the motor is being assembled, can be delivered preassembled as a complete unit to the assembly line. The working element can be welded, for example, in the intervening space with intake tubes. This is possible both with metal and with plastic intake ducts. The advantage thereby achieved is that the working element and the intake duct stiffen one another, with a saving of material.

It is advantageous to make the filter housing, or at least the part of the intake tube, in one piece with the working element. This can be done with an injection molding, for example. In that case the unit can be in the form of an intake tube shell and connected to other intake duct shells. It is also possible to make the entire intact duct together with the working unit by the lost wax casting method, for example. By these measures the steps involved in welding can be omitted and the part can be produce in a single manufacturing procedure.

An advantageous embodiment of the invention can be achieved if the working unit has a flange by which it is fastened directly to the internal combustion engine. This additionally reinforces the entire component. Also, in this manner connections to the internal combustion engine can be made which are needed for the working unit. If the working unit is an oil filter, a particularly advantageous embodiment of the invention is to provide the filter housing with a filter flange which achieves at least one connection to the oil circuit of the internal combustion engine. This results in greater component integration. The otherwise necessary connection routes to the oil filter can be avoided. It is advantageous to integrate into the filter flange both the inlet for the oil to be cleaned and the outlet for the clean oil, as well as the oil return in the event of a filter change. In this way the best degree of integration of the filter flange is achieved. At the same time the oil outlet and the oil return can be combined in a single connection.

Similar advantages can be achieved if, instead of the filter housing, the working element is a housing for the oil mist separator of the crankcase gas exhaust. This also requires a flange on the internal combustion engine in which at least one gas inlet for the crankcase gas and an oil return for the separated oil must be provided.

Depending on the dimensions of the individual working elements, a plurality of them can be arranged in an intervening space or in different intervening spaces between the air intake tubes. This represents only a multiplication of the integration ideas of the invention.

In accordance with an additional preferred embodiment of the invention, the socket for an oil cooler is additionally provided on the filter flange. It can be mounted compactly under the intake duct. For this purpose the filter flange can be made double-sided, one side communicating with the internal combustion engine and the other side with the oil cooler. This embodiment is a consequential development of the integration idea. It expands the system limits of the intake duct as a complete part, so that additional steps in the final assembly of the internal combustion engine can be eliminated.

If the intake duct is rigidly affixed to the internal combustion engine by the filter flange, an advantageous embodiment of the invention results wherein the outlets of the intake duct at the cylinder head end are attached to the internal combustion engine through resilient or elastic isolating elements. These may be, for example, rubber rings which permit relative movement between the intake duct and the internal combustion engine. This prevents the intake duct with the integrated filter from being statically overmatched which would result in the need for very low tolerances in the component. This, however, is to be avoided.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail below with reference to illustrative preferred embodiments shown in the accompanying drawings in which.

DESCRIPTION OF PREFERRED EMBODIMENTS

Figure 1:
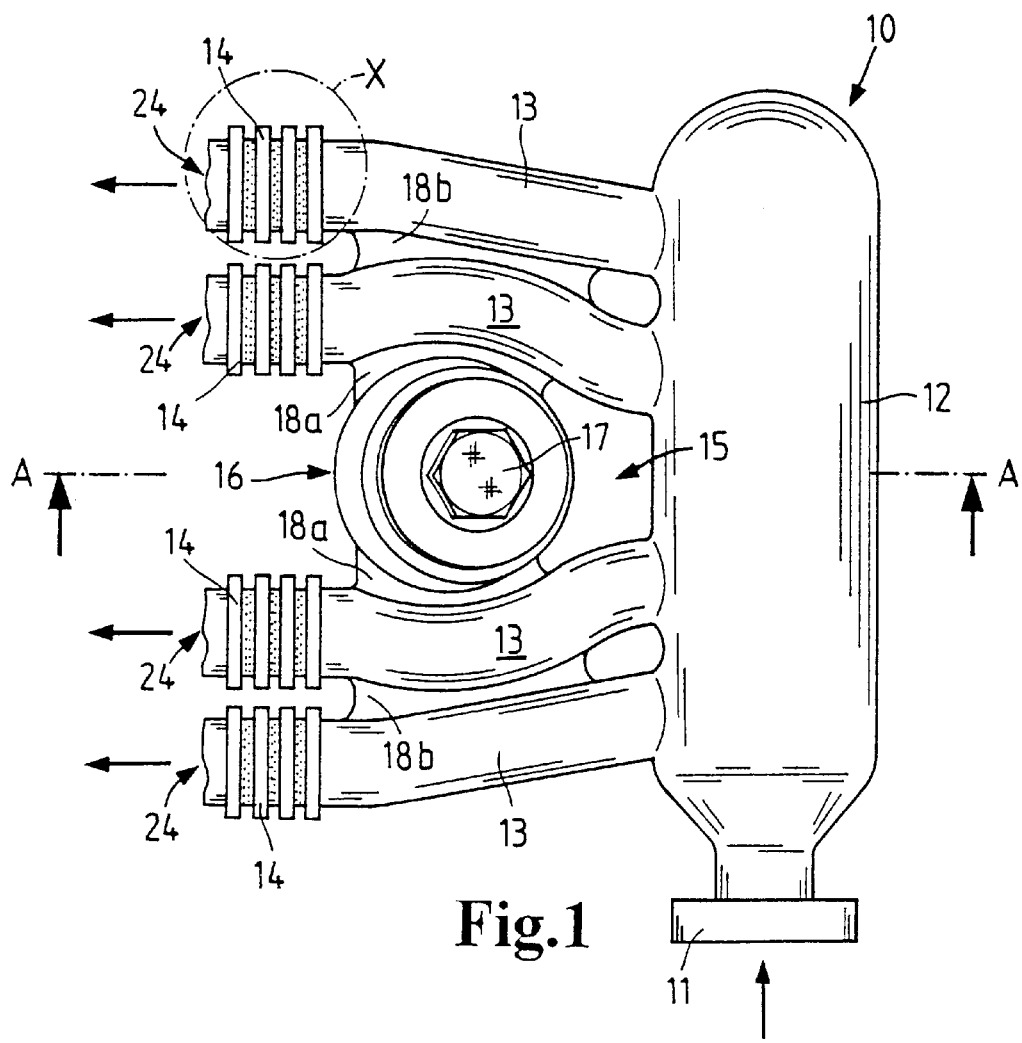
FIG. 1 is a plan view of an intake duct with built-in oil filter and four intake tubes which are provided with isolating means.

FIG. 1 shows the construction of the air intake duct 1 according to the invention. It has an inlet 11 which leads into a manifold 12 from which intake tubes 13 extend to outlets 24 which are connected to the internal combustion engine, not shown, by isolating elements 14. The direction of flow of the intake air is indicated by arrows.

Between two of the air intake tubes 13 an intervening space 15 is provided which serves to contain a filter housing 16. The latter is closed by a cap 17. To increase rigidity the intake tubes are joined to one another and the filter housing 16 is joined to the intake tubes by ribs 18a, 18b. Thus the filter housing together with the intake duct is a single unit which can be made by casting methods, for example. As an alternative, the filter housing could also be made separately. The arrangement would be the same as FIG. 1, except that the ribs 18a would and be omitted.

Figure 2:
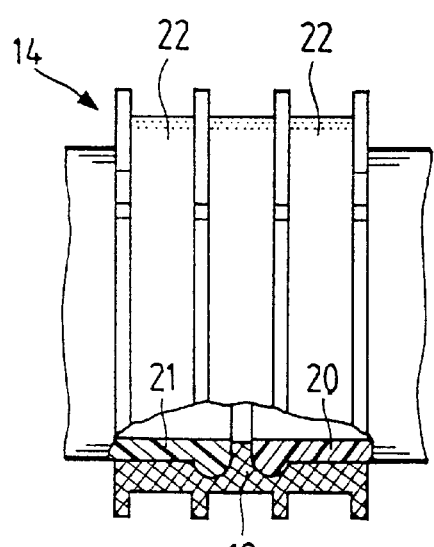
FIG. 2 shows the detail X of FIG. 1, partially cut away.

In FIG. 2 there is shown the construction of the isolating element 14. It is comprised of a rubber sleeve 19 into which the intake tube ends 20 and a connecting end 21 of the internal combustion engine are inserted such that they do not touch one another. The respective ends are prevented by means of annular collars 22 from escaping the rubber sleeve 19.

Figure 3:
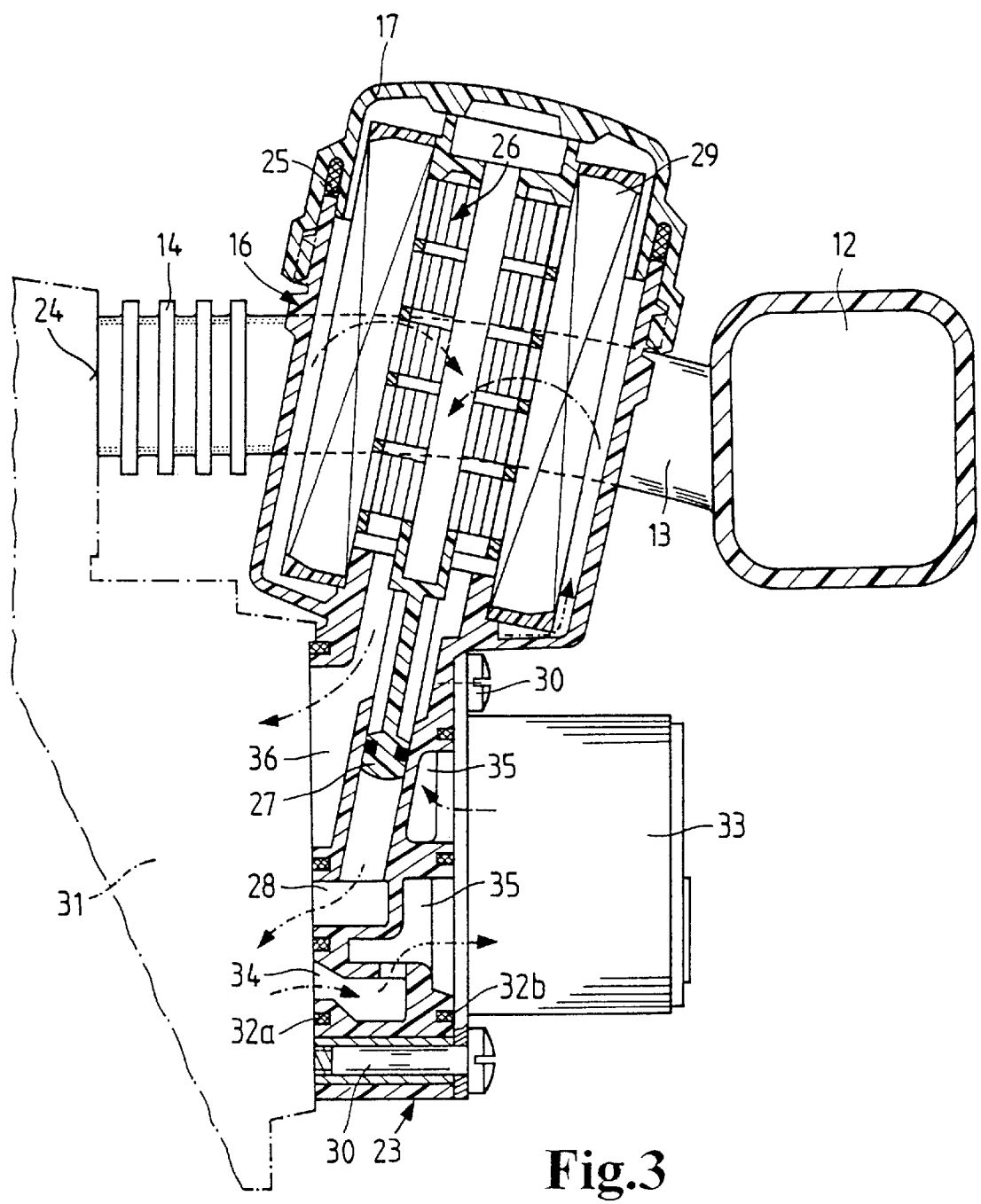
FIG. 3 shows the section A—A of FIG. 1, in which the internal combustion engine and a cooling system for the oil are additionally indicated.

FIG. 3 shows the construction of the filter integrated with the intake duct. The view section passes through the filter housing 16, a filter flange 23, and the manifold 12. The filter housing has an upwardly directed opening which is closed by the cap 17 with the aid of a gasket 25. A support tube 26 is affixed to the cap, by welding, for example. The latter has a gasketed plug 27 for an oil drain 28. To replace a filter insert 29 the cap with the supporting tube is removed, resulting in the drainage of the filter housing 16.

The filter flange is double-sided and fastened by screws 30 to the internal combustion engine indicated at 31. A gasket 32a provides for a seal between the filter flange and the internal combustion engine. On the other side of the flange there is mounted an oil cooler 33 with the aid of a gasket 32b, the screws 30 also serving to attach it.

During operation the oil in the internal combustion engine takes the path through the working unit indicated by arrows. It passes through an oil inlet 34 into a channel structure 35 through which it is fed into the oil cooler 33, and is returned after it is cooled. From there it goes to the filter housing 16, flows through the filter insert 29 from the outside in, and inside of the supporting tube 26 is reaches the oil outlet 36 which leads back into the internal combustion engine.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An intake duct for an internal combustion engine, which has a manifold with an inlet for combustion air and at least two intake tubes with outlets at ends associated with cylinders of the engine, wherein an intervening space is provided, which is formed by adjacent intake tubes for accommodating an additional working element of the internal combustion engine, and wherein the working element is a filter housing having a filter flange which can be connected to the internal combustion engine such that at least one connection to the oil circuit of the internal combustion engine is formed.

2. An intake duct according to claim 1, wherein the filter housing is affixed to the intake duct.

3. An intake duct according to claim 2, wherein the filter housing is made in one piece with at least part of the intake duct.

4. An intake duct according to claim 1, wherein the filter housing has a flange for connection to the internal combustion engine.

5. An intake duct according to claim 1, wherein mechanical isolating elements are provided on the intake duct at the ends of the intake tubes associated with the cylinders of the engine.

6. An intake duct for an internal combustion engine, which has a manifold with an inlet for combustion air and at least two intake tubes with outlets at ends associated with cylinders of the engine, wherein an intervening space is provided, which is formed by adjacent intake tubes for accommodating an additional working element of the internal combustion engine, wherein the working element is a filter housing having a filter flange which can be connected to the internal combustion engine such that at least one connection to the oil circuit of the internal combustion engine is formed, and wherein the filter flange has an oil inlet, an oil outlet, and an oil return.

7. An intake duct according to claim 6, wherein the filter housing is affixed to the intake duct.

8. An intake duct according to claim 7, wherein the filter housing is made in one piece with at least part of the intake duct.

9. An intake duct according to claim 6, wherein the filter housing has a flange for connection to the internal combustion engine.

10. An intake duct according to claim 6, wherein mechanical isolating elements are provided on the intake duct at the ends of the intake tubes associated with the cylinders of the engine.

11. An intake duct for an internal combustion engine, which has a manifold with an inlet for combustion air and at least two intake tubes with outlets at ends associated with cylinders of the engine, wherein an intervening space is provided, which is formed by adjacent intake tubes for accommodating an additional working element of the internal combustion engine, wherein the working element is a filter housing having a filter flange which can be connected to the internal combustion engine such that at least one connection to the oil circuit of the internal combustion engine is formed, and wherein the filter flange comprises a mounting for an oil cooler and channel structures for connecting the oil cooler to the lubricating oil circuit of the internal combustion engine.

12. An intake duct according to claim 11, wherein the filter housing is affixed to the intake duct.

13. An intake duct according to claim 12, wherein the filter housing is made in one piece with at least part of the intake duct.

14. An intake duct according to claim 11, wherein the filter housing has a flange for connection to the internal combustion engine.

15. An intake duct according to claim 11, wherein mechanical isolating elements are provided on the intake duct at the ends of the intake tubes associated with the cylinders of the engine.

* * * * *